March 15, 1960   M. A. GAGNON   2,928,100
SEPARABLE PLASTIC LINKS
Filed Nov. 24, 1958
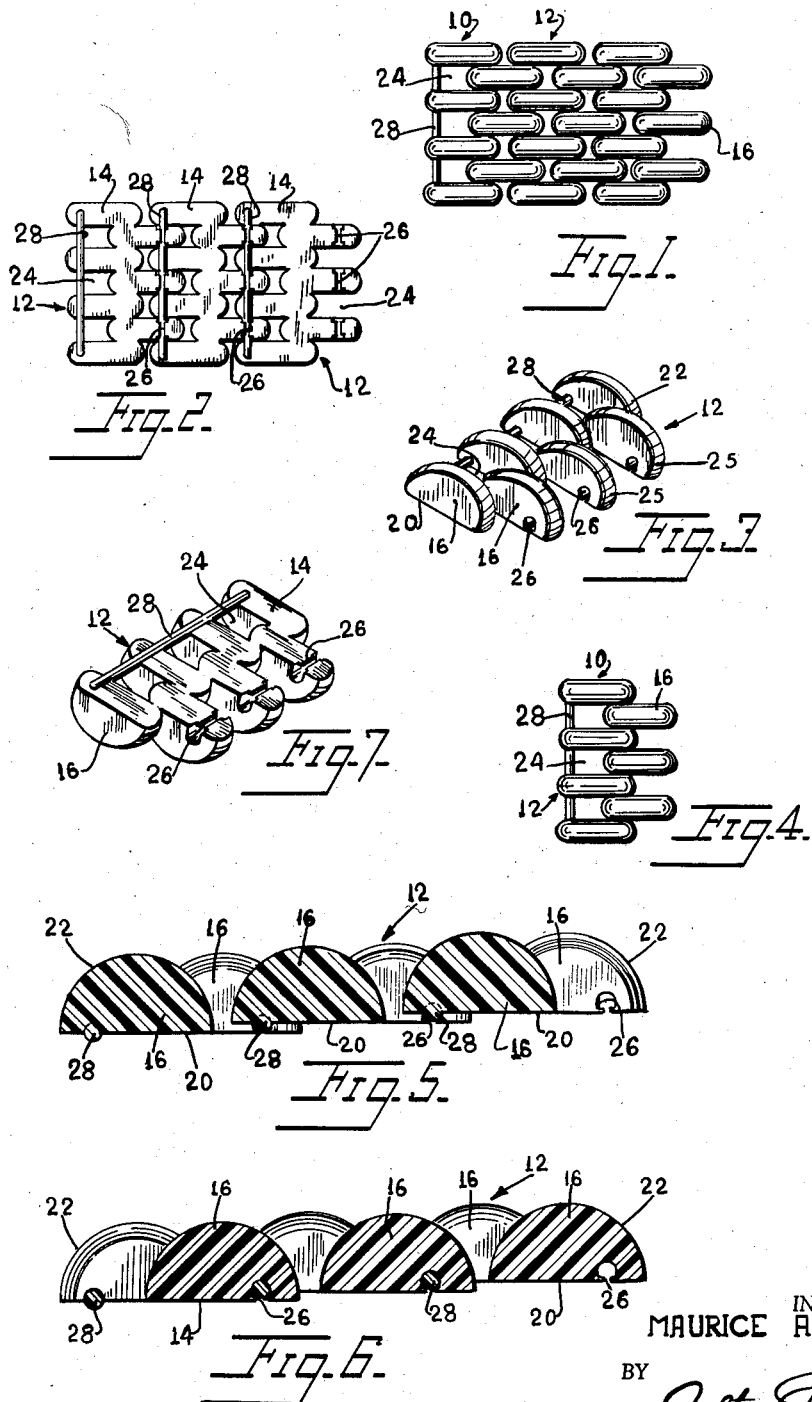
INVENTOR.
MAURICE A. GAGNON
BY
ATTORNEY

United States Patent Office 2,928,100
Patented Mar. 15, 1960

2,928,100

SEPARABLE PLASTIC LINKS

Maurice A. Gagnon, Lonsdale, R.I.

Application November 24, 1958, Serial No. 775,844

1 Claim. (Cl. 2—339)

This invention relates to articulated belts and similar bodies composed of detachable plastic links and adapted to be worn on the person.

A principal object of the present invention is to provide an improved belt or the like for personal wear which is made in initially separate and cheaply produced components adapted to be readily interengaged and secured together.

Another object of the invention is to provide such a belt or the like which does not require to be furnished with a buckle or any special fastener whereby the ends of the belt or the like can be secured together and relatively adjusted.

It is also an object to provide a belt, or the like, for personal wear, the effective length of which can be readily increased or decreased by the simple addition thereto or subtraction therefrom of one or more initially separate components.

A further object of the invention is to provide a belt or the like composed of a series of plastic links adapted to be readily assembled and disassembled.

It is also proposed to provide a plastic belt or the like of this kind that is simple in construction, attractive in appearance and that can be manufactured and sold at a reasonable cost.

Broadly, the invention comprises a series of concatenations of initially separate but interengaged rectangular components constituting a belt or the like, each of which concatenations has formed therein a number of shallow aligned grooves along one long edge thereof constituting sockets and a rail parallel to said shallow grooves, along the other long edge thereof, constituting plug sections adapted to be snapped into, engaged and retained in the aligned grooves of the next adjoining component.

For further comprehension of the invention, and of the objects and advantages thereof, reference will be had to the following description and accompanying drawings, and to the appended claim in which the various novel features of the invention are more particularly set forth.

In the accompanying drawings forming a material part of this disclosure:

Fig. 1 is a top plan view of a fragment of a belt made in accordance with the present invention.

Fig. 2 is a bottom plan view of a fragment of the belt shown in Fig. 1.

Fig. 3 is a perspective view of one of the belt components.

Fig. 4 is a top plan view thereof.

Fig. 5 is a sectional view taken through the longitudinal center of Fig. 1.

Fig. 6 is a sectional view taken through the longitudinal center of Fig. 2.

Fig. 7 is a bottom perspective view of the link component showing the locking rail.

Referring in detail to the drawings, in Fig. 1 the invention is illustrated in the form of an articulated belt designated generally at 10. The belt is composed of a series of individual components 12 which are linked together chainwise. Each of these initially separate components or links is injection molded in a resilient thermoplastic material, and as exemplified by the particular component shown in Figs. 3 and 4, comprises a substantially rectangular-shaped body 14 composed of a plurality of semicircular members 16, with flat sides 18, flat bottom 20 and curved tops 22 as viewed in Fig. 3, the members being arranged in vertical position as viewed in Fig. 3, in two rows, one row having four members 16 and the other row three members, the ends of the members of one row being integral in side-by-side and overlapping relation with the adjacent ends of the members of the other row, leaving spaces 24 between the free ends of the numbers.

The members 16, of one row, along one long edge of the body, the row with the three members are each formed with a transverse shallow groove 26 adjacent its outer end, opening outwardly of the flat bottom the grooves 26 being disposed in alignment and extending in a direction parallel to said long edge. The body along the members 16, of the other row, along its other long edge, the row with the four members is molded with a rail 28, the rail projecting below the bottom of the body as viewed in Fig. 3 and connecting the adjacent protruding ends of the members 16 of said other row. The rail 28 is disposed parallel to the grooves 26. The depth of the grooves is equal to the thickness of the rail 28. The back or bottom of the belt is mainly flat and plane while the opposite surface thereof, or the front, is formed by the curved tops 22 of the members thereby constituting ridges, ribs and/or apertures to present a geometric design of an attractive, ornamental character. The components 12 are formed of tough, resilient plastic material. For example, the components may be injection molded, each in one piece, in a resilient thermoplastic, such as polythene or polyvinyl chloride.

The diameter of the rail 28 is approximately the same as the diameter of the socket grooves 26 and such as to enable said rail to be inserted into and received snugly in the grooves of the next adjoining component of a belt or the like. When a rail 28 is inserted and pressed home into the socketed grooves 26 of an adjoining component, the walls of said grooves yield suchwise as to enable the rail to pass through the grooves and thereupon react to spring into locking position with said adjoining component as shown in Figs. 1 and 2.

The distance between the center of the grooves 26 and the center of the rail 28 is the same in respect of each component 12 so that in a completed belt, the grooves receive the rails and the spaces 24 receive the untied protruding ends 25 of the members 16.

The components 12 are interengaged and locked with one another by simply pressing the socketed grooves 26 of one component onto and over the rail 28 of the adjoining component until the walls of the grooves snap around the rail into interlocking engagement.

The improved belt, strap or the like thus consists of a longitudinal series or chain of unitary components which are concatenated by rail-and-groove connections. The elongated form of the belt is produced by fastening together its initially free ends and this is accomplished by the simple expedient of engaging the walls of the grooves of one component with the rail of the adjoining component. Moreover, by disconnecting one or more of the unitary components 12 from either end of the belt, the belt can be reduced in length whereas, conversely, by linking one or more additional components to the chain the effective length of the belt, strap or the like can be increased according to the requirement of the wearer.

The bodies of the components may be variously ornamented and colored to present a wide variety of different geometrical designs.

While I have illustrated and described the preferred embodiment of my invention, it is to be understood that I do not limit myself to the precise construction herein disclosed and that various changes and modifications may be made within the scope of the invention as defined in the appended claim.

Having thus described my invention, what I claim as new and desire to secure by United States Letters Patent is:

A component for a chain, comprising a body formed of flexible molded plastic material, said body consisting of a plurality of rows of semicylindrical members each having flat parallel substantially semicircular sides and flat diametral rectangular faces, said members being arranged in staggered relation with two opposed diametral end portions of the sides of each member overlapping and integral with two spaced diametral end portions of sides of two other adjacent members, each member in one row of said members having a free diametral end portion with a groove in the rectangular face thereof, the grooves in the members of said one row being disposed in axial alignment, a rail integrally formed with a free diametral end portion of each member in the other row of members, said rail projecting below the rectangular faces of said body to facilitate engagement in aligned grooves in another similar body, the first-named aligned grooves being adapted to receive a rail of still another similar body for forming said chain, whereby the members of said chain will be inseparable when pulled in directions parallel to said diametral faces.

References Cited in the file of this patent
UNITED STATES PATENTS

| | | |
|---|---|---|
| 2,303,294 | Wagner | Nov. 24, 1942 |
| 2,451,397 | Marquardt | Oct. 12, 1948 |
| 2,737,775 | Schigas | Mar. 13, 1956 |